No. 839,096. PATENTED DEC. 25, 1906.
B. BIDWELL.
APPARATUS FOR COOLING ELECTRIC MOTORS AND GENERATORS.
APPLICATION FILED MAY 28, 1906.
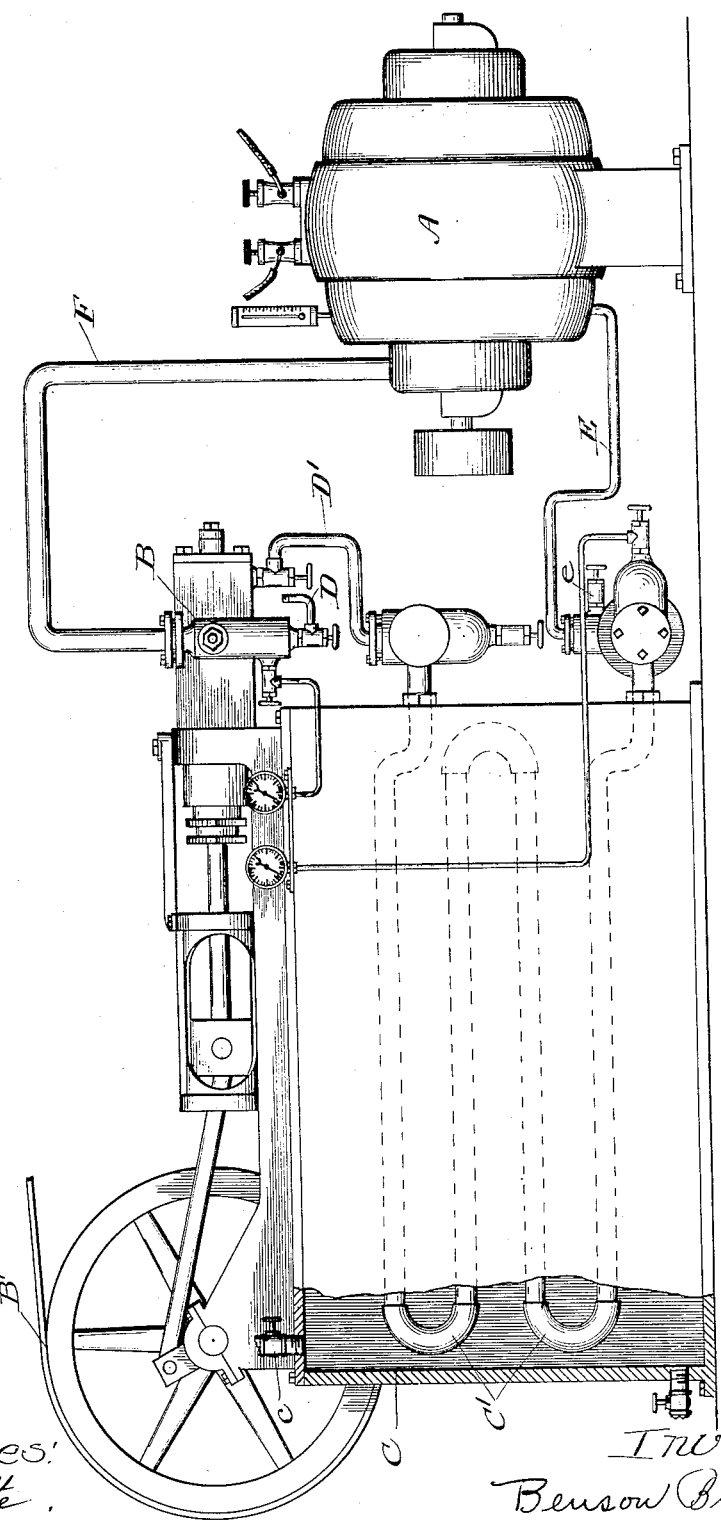

UNITED STATES PATENT OFFICE.

BENSON BIDWELL, OF CHICAGO, ILLINOIS.

APPARATUS FOR COOLING ELECTRIC MOTORS AND GENERATORS.

No. 839,096.      Specification of Letters Patent.      Patented Dec. 25, 1906.

Application filed May 28, 1906. Serial No. 319,083.

*To all whom it may concern:*

Be it known that I, BENSON BIDWELL, a citizen of the United States, residing at Chicago, Cook county, Illinois, have invented certain new and useful Improvements in Apparatus for Cooling Electric Motors and Generators, of which the following, taken in connection with the drawings, is a description.

My invention has for its object the production of apparatus for keeping electric motors and generators cool while in operation, and thereby prevent a large percentage of the loss caused by said motors heating and often burning out. Heretofore various means have been employed to attain this result, some of which have been more or less successful, but not sufficiently so to produce a practical operative improvement over old methods, largely for the reason that the cooling agent employed was not continuously condensed or reinforced after its expansion or refrigeration and continuously introduced within and throughout the machine in a way that would produce the result desired.

By my present invention I have provided a combination of mechanisms which entirely overcome the above-named objection and, as will be hereinafter explained, can be regulated to a nicety as to the close connections applied to return the cooling gas or freezing substance into the compressor or pump and recompress or reinforce it as fast as it expands and refrigerates, thus enabling me to continuously run a motor or generator entirely cold for any length of time desired without stopping, thus enhancing the practical use, value, and life of those machines many times. It is a well-known fact that by keeping a generator cold the speed of the armature can be doubled, and thereby increase the capacity of the machine by a hundred per cent.

By my improved method of using the combination of a compressor, a condenser, or a pump and a motor I can either increase the speed of the armature or can build the motors and generators at about one-half of the cost and size of those now in use and get the same capacity now obtained from ordinary motors and generators.

I have illustrated one form of device embodying the principle of my invention, although the same may be carried into effect in other ways without in the least departing from the spirit thereof.

In the drawing the figure represents a side elevation of a motor, compressor, and condenser with inlet and outlet pipes connecting the same for the purpose hereinafter explained.

A is a casing surrounding a motor or generator which may be of any well-known form of construction, and which casing is preferably air-tight.

B is a compressor which may be of any form in general use and which is operated by any suitable source of power transmitted thereto through the belt and pulley B', or it may have a direct connection.

C is a tank which is preferably kept filled with cold water through pipe $c$, and inside of said tank are the condensing-coils C'.

I wish to be understood as contemplating the use of any cooling agent suitable for the purpose, but preferably gas, which is replenished in the compressor through pipe D, which pipe may be connected with any suitable supply of refrigerating substance. When the valve $e$ is opened, the gas enters the motor-casing A through pipe E and there expands and refrigerates the interior of the motor. The cooling gas or refrigerating substance returns to the compressor through pipe F and is again compressed in compressor B and passes into the condenser-coils C', being used over and over continuously. Cooling-coils may or may not be provided inside of the casing A inclosing the motor.

The advantages of my invention will be apparent to those skilled in the art.

Changes in the details of construction may be made without departing from the spirit of my invention, which consists, essentially, in providing means for continuously supplying a constant refrigeration to the motor, preventing it from heating, and returning the expanded gas or other substance back to the compressor or pump to be used over again.

I claim—

In an apparatus of the character described, the combination with a dynamo-electric machine and an air-tight casing inclosing the same and forming an expansion-chamber for a cooling agent, of a condenser and a compressor located exteriorly of said casing, and pipes connecting said compressor and condenser with the interior of said casing whereby the cooling agent is conveyed from the condenser to said casing and after it has expanded is carried to the compressor to be used over again.

In testimony whereof I have signed this specification in the presence of two subscribing witnesses.

BENSON BIDWELL

Witnesses:
F. H. KING,
D. C. PRIEBE